Sept. 22, 1942.　　　M. OTTO ET AL　　　2,296,399
PROCESS OF PRODUCING POLYMERS
Filed Sept. 8, 1939
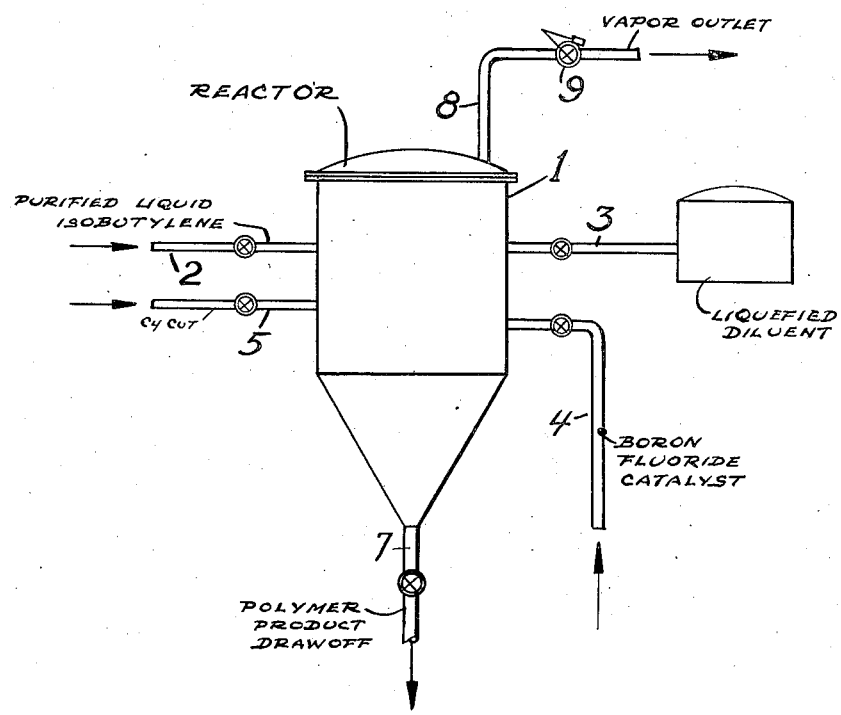
Michael Otto
Helmuth G. Schneider   Inventors
By P. L. Young   Attorney Patented Sept. 22, 1942

2,296,399

UNITED STATES PATENT OFFICE 2,296,399

PROCESS OF PRODUCING POLYMERS

Michael Otto, Ludwigshafen-on-the-Rhine, Germany, and Helmuth G. Schneider, Roselle, N. J., assignors, by mesne assignments, to Jasco, Incorporated, a corporation of Louisiana Application September 8, 1939, Serial No. 293,904

3 Claims. (Cl. 260—82)

The present invention relates to an improved method for producing valuable polymers, and more specifically polymers of isobutylene which may be used for various purposes. The invention will be fully understood from the following description.

Isobutylene can be polymerized to bodies of high molecular weight at low temperatures of the order of —40° C. to —100° C. For such process it is preferable to use catalysts, and among these the active halide catalysts such as boron fluoride and aluminum chloride or other catalysts may be used, but sulfuric acid and active clay catalysts are also applicable.

The polymers produced in this way are quite different from the well known dimers and trimers of isobutylene and range from very viscous oils to plastic solid or semi-solid rubbery materials which are all freely soluble in hydrocarbon oils. Liquid products may be used alone as lubricating oils or they may be blended with natural oils, while the plastic solid or semi-solid polymers are of the greatest importance in thickening oils and simultaneously in raising their viscosity indices.

It has hitherto been supposed that the most advantageous method of making such polymers was to use isobutylene of the highest possible purity, and it was found that the degree of polymerization, that is to say as represented by the viscosity or plasticity of the polymer could be controlled by selection of the proper temperature at which the polymerization is brought about. Thus to make an oil only moderately low tempertures were required while to produce plastic solid polymers of progressively higher molecular weights, progressively lower temperatures were required.

By the means disclosed above, polymers of various molecular weights and thickening powers can be produced which are suitable for blending with lubricating oils and other petroleum products. One advantage of these polymers is that while quite resistant to heat they tend to depolymerize and leave no solid carbonaceous residues. In general it is found that the heavier, that is the higher the molecular weight of the product, the more readily it decomposes, and since at the same time the higher molecular weight product have the greatest thickening power, it is particularly desirable to limit the molecular weight range of polymers avoiding excessively high and low polymers, and increasing the yield of fractions whose molecular weights do not greatly differ from the average.

It has been found that the increased stability can be achieved by conducting the polymerization in the presence of materials which poison or inhibit the reaction. These poisons, which will be described below, do not, of course, prevent reaction under all conditions, but their presence requires a lower temperature to produce a polymer of a given average molecular weight than is required to produce a polymer of the same molecular weight range from isobutylene in the absence of such poison. In general, the required temperature reduction may be from 20 to say 50° C. or even more depending on the particular poison, its amount and other conditions such as the catalyst, the amount of inert diluent and the like.

A variety of different materials have been found which are capable of poisoning the polymerization of isobutylene. Among these may be included first the organic sulfur containing compounds, particularly mercaptans, and sulfides among which the di- and polysulfides are included. Hydrogen sulfide also has a similar effect. Alkyl halides of activity sufficient to give a precipitate with a warm solution of alcoholic silver nitrate, such as secondary or tertiary alkyl fluorides or chlorides are also to be classed among the poisonous materials. The foregoing must be used in extremely small amounts, say less than 1% and control must be very accurate for if too much be added solid polymers, especially having a molecular weight above 10,000, cannot be obtained with practically or commercially obtainable temperatures. Olefins of more than 2 carbon atoms other than isobutylene including normal butylene or propylene and the like are also poisonous and are more useful because not so extreme in their action as sulfur for example. The proper amount of such poison ranges from say 10% to 25% so that this is easy to control and gives excellent commercial results. Small amounts of hydro-halides, such as hydrochloric or hydrofluoric acid, act as poisons for making solid high molecular weight polymers at low temperature, even though at higher temperatures they may even accelerate production of liquid oily polymers. Among the other materials which may be included in the general scope of poisons are small amounts of lubricating oils or of aromatic hydrocarbons such as benzol or toluol, or normally liquid olefins. In general it may be said that all sulfur, oxygen and nitrogen compounds having high dipole moments and forming stable complexes with Friedel-Crafts catalyst, and soluble in liquefied gaseous hydrocarbons are poisonous in the range of about 0.2–1.0%. This applies to alcohols, esters, ethers, amines, nitrobenzene, etc.

In carrying out the present process for polymerization in the presence of poisons it is necessary to have an accurate control over the nature and the amount of the poison present so that the temperature may be definitely fixed and uniform products of the desired quality obtained. The isobutylene is preferably highly purified for this reason so as to remove as completely as possible all poisonous materials of the above classes. The isobutylene may be prepared from any desired source, for example, from tertiary or isobutyl alcohol by dehydration or preferably from cracked light oils, for example, by polymerizing the isobutylene content into low molecular weight polymers with sulfuric acid of 50 to 70% strength. The polymer may be then separated from inert constituents and depolymerized, for example, by heat in the presence of suitable catalysts so as to regenerate isobutylene, which is recovered as a fraction containing close to 90 or 100% isobutylene.

Such methods as have been disclosed above yield what might be termed moderately purified isobutylenes which may be further purified by careful distillation, washing with caustic soda or with sodium plumbite, or washing with aqueous triethanol amine or similar substances to remove hydrogen sulfide and organic sulfur. Various combinations of these latter methods may be used depending upon the source of the isobutylene and, of course, on the particular impurities which it contains. Such secondary treatments are capable of producing what is termed a highly purified isobutylene.

To the highly purified isobutylene may then be added any particular poison desired, for example, as little as .05% of a light mercaptan or from .2 to 1% of tertiary butyl fluoride, but instead of any specific poison, mixtures of different poisonous materials may be used, for example, a suitable volume of a partially purified isobutylene may be added to the highly purified product, or a smaller amount of the cracked light oils from which the purified isobutylene is derived, because such materials are rich in poisons, and are readily available.

The polymerization is preferably conducted in the presence of a diluent. This material should also be purified in much the same manner as discussed above, especially to remove from its olefins and sulfur compounds. For this purpose, hydrogenation is quite effective. The diluent can be used and reused many times and preferably consists of butane or propane or mixtures thereof with or without ethane or ethylene. It is, of course, quite possible to purify a fraction to the desired degree, leaving in it the desired amount of poison and while this is contemplated it is not recommended and is much more difficult than to purify completely and add the required poison.

The polymerization itself may be conducted in batch or continuously, in any desired method with any of the catalytic materials described above and the temperature, as has been stated, is reduced so as to produce a polymer of the desired molecular weight range. It should be borne in mind that, just as in the absence of poison, the lower the temperature the higher will be the average molecular weight of the polymer mixture produced, and furthermore, that due to the presence of the poison a lower temperature must be used to produce a given molecular weight when poison is present than would be necessary in the absence of the poison.

As stated above, the polymerization may be in batch or in a continuous flowing system, but in either case an adequate means should be applied for removal of heat which is liberated to a large extent. In order to obtain a uniform polymer, it is necessary to keep a close control on the amount of the poison present, the amount of diluent and the temperature at which the polymerization is effected. No particular means, however, is necessary for effecting any of these conditions and poison may be added either to the isobutylene or diluent, either during or prior to reaction.

The following method has been found to be most readily applicable to present refinery practices. Oil cracked for gasoline production is stabilized by rectification and a cut is ordinarily produced known as the $C_4$ cut. This largely consists of butanes and butylenes with very minor quantities of propane, propylene, pentane and amylene. This cut ordinarily contains from 10 to 20% of isobutylene.

A highly purified isobutylene fraction is obtained from $C_4$ cut by absorbing the isobutylene in liquid condition in 50 to 65% sulfuric acid which is remarkably specific to isobutylene under those conditions. In this way the isobutylene is separated from other olefins and saturated hydrocarbons. Gentle heating of the acid-isobutylene solution causes a polymerization to dimers and trimers of isobutylene and these may be separated from the acid. They are then cracked or depolymerized in the presence of active clays so as to yield a highly purified isobutylene containing from 90 to 100% of that material.

To 1 volume, for example, of this highly purified isobutylene is now added, say, 4 volumes of the raw $C_4$ cut giving a mixture which will contain from about 20 to 40% of isobutylene and 10 to 20% of other olefins, the balance, averaging 50%, being made up of saturated hydrocarbons. It is found that this fraction may be polymerized directly and requires no further diluent and the concentration of the other olefins is within the proper range for the most suitable control to bring about the poisoning effect disclosed above.

The product produced in the manner stated above is more stable than polymers obtained in the absence of the poison. The reason for this is not entirely known, but it has been observed that while in all cases the polymer produced is a mixture of molecules of a rather wide molecular weight range, this range is narrower when polymerization is conducted in the presence of a poison and it is believed that this may be the reason for its greater stability.

The polymers may be added to lubricating oils and other products, for example, in proportion of .1 to 5% or more and thereby effect a substantial thickening of the oil or, in other words, increase in viscosity. They also produce at the same time an increase in viscosity index of the oil and are highly desirable for that reason. Stability can best be illustrated by loss in viscosity under severe working conditions; for example, the polymer blend in oil may be circulated through a small orifice under high pressure and the relative decreases in viscosity measure the relative stabilities of the different polymers. The oils also may be run under definite conditions between gear teeth so as to show a loss in viscosity. Such tests are, of course, more severe than the actual conditions of use so as to give an accelerated loss of viscosity. It has been found, as is indicated before and as will be specifically shown in the examples, that products produced in the presence of a poison are more stable to working conditions than those which are produced in the absence of a poison. Otherwise the present polymers appear to be identical with the polymers produced in the absence of poisons in that they are colorless, completely soluble with hydrocarbons and when decomposed by heat do not leave solid residues.

*Example I*

In order to illustrate generally the effect of poisons on the polymerization of isobutylene a large quantity thereof was carefully purified particularly so as to be free from sulfurs, halides and other poisons. To this highly purified isobutylene were then added small amounts of different poisonous materials and polymerization experiments were carried out under identical conditions with the several samples, including a blank on the purified isobutylene to which no poison had been added. In each case polymerization was conducted in the presence of three volumes of purified propane to one of isobutylene and a temperature of —50° C. was maintained during all runs. In the table the results are indicated showing the particular poison used and the amount thereof, the yield of the polymer and its tetrahydronaphthalene number. The tetrahydronaphthalene number represents thickening power and is numerically equal to the viscosity at 20° C. of a solution containing 2.8% of the particular polymer in tetrahydronaphthalene taking the viscosity of water at 20° C. as unity. This number represents therefore the thickening power of the polymer, the greater the number the greater being its thickening power. The average molecular weight of the polymer is proportional to the tetrahydronapthalene number but since molecular weights are more difficult to obtain, tetrahydronaphthalene numbers are preferred.

| Poison | Amount of poison | Yield of polymer | Tetrahydro-naphthalene No. of polymer |
|---|---|---|---|
| | | Per cent | |
| Mercaptan—B. P. —30° C. | .15% | 29.0 | 3.4 |
| Do | .05% | 55.0 | 6.83 |
| Ethyl thio ether | .15% | 37.5 | 4.51 |
| H$_2$S | Bubbled thru for ½ min. | 5.0 | Oily liquid |
| No poison | | 87.5 | 10.85 |

*Example II*

In the following test polymers of isobuylene were prepared on the one hand from highly purified materials as free as possible from poisonous agents, while on the other comparative tests poisons were present during the polymerization. In these pairs of comparative tests (including one preparation where poison was used and one where no poison was present), temperatures of polymerization were in all cases below —40° C. and adjusted to give equal tetrahydronaphthalene numbers.

After the said polymers had been prepared, equal quantities (of the comparative polymers) were added to different samples of a lubricating oil having a viscosity of 66 Saybolt seconds at 210° F. The several samples were then run in a Chevrolet engine connected to a dynamometer under as close to identical conditions as possible, each for a period of four hours. At the end of these tests the loss in viscosity of the polymer-oil blends were measured. The data is as follows:

| Exp. No. | Method of production | T. N. of Exanol | Loss in viscosity, Saybolt seconds at— | |
|---|---|---|---|---|
| | | | 100° F. | 210 °F. |
| 1 | Isobutylene polymerized in the presence of pure propane | 7.2 | ᵃ 20 | ᵃ 2.0 |
| 2 | 160 pts. isobutylene, 400 pts. propane, 30 pts. C$_4$ fraction containing poisons reacted at —55° C | 7.2 | 14 | 1.2 |
| 3 | Isobutylene polymerized in the presence of pure propane | 7.7 | ᵃ 25 | ᵃ 2.0 |
| 4 | 160 pts. isobutylene, 400 pts. propane, 200 pts. C$_4$ fraction containing poisons reacted at —80° C | 7.7 | 8 | 1.4 |
| 5 | Isobutylene polymerized in the presence of pure propane | 8.7 | ᵃ 37 | ᵃ 3.5 |
| 6 | 160 pts. isobutylene, 400 pts. propane, 25 pts. C$_4$ fraction containing poisons reacted at —55° C | 8.7 | 20 | 2.3 |

ᵃ Average data from a number of determinations.
NOTE.—By polymerization at progressively lower temperatures, the increasingly higher T. N. exanols in Expts. 1, 3 and 5 are obtained.

*Example III*

Polymers of isobutylene were prepared as in Example II in the one case, using pure propane as a diluent and pure isobutylene, in the other case isobutylene obtained from a cracking operation without subsequent purification so that it contained natural poisonous impurities. For the diluent in the latter case propane was used which had been used and reused before for the same purpose. The blends of these polymers were made up as before and comparative tests were made on the Chevrolet engine for a period of four hours. Loss in viscosity is given in the table below:

| Polymer and method of production | T. N. of polymer | Loss in visisity, Saybolt seconds at— | |
|---|---|---|---|
| | | 100° F. | 210° F. |
| Impure isobutylene and reused propane | 7.7 | 4.0 | 0.7 |
| Pure isobutylene and pure propane | 7.7 | 25.0 | 2.0 |

The latter is an average of a large number of tests.

*Example IV*

Tests similar to those given above were made showing that a 7.8 T. N. polymer prepared at —78° C. from materials containing poisons is more stable than a 6.5 T. N polymer prepared at —45° C. from highly purified materials.

*Example V*

Tests similar to those above showed that a 5.25 T. N. polymer of isobutylene prepared at —80° C. in the presence of a crude refinery butane cut is more stable than a 5.6 T. N. polymer prepared at —45° C. from purer materials. The stability of the 5.25 T. N. polymer was considerably more than could be accounted for by the slightly lower number.

*Example VI*

A highly purified isobutylene was polymerized at —78° C. with boron fluoride to a polymer having a molecular weight of about 70,000. This polymer was quite unstable to mechanical working. On the other hand, a C₄ cut, containing about 20% of isobutylene, when similarly polymerized at −78° C. with boron fluoride, gave a polymer having a molecular weight of about 3,000. In contradistinction to the above two tests, a mixture of 50% by volume of highly purified isobutylene and 50% by volume of C₄ cut when polymerized at −78° C. with boron fluoride, gave a polymer having a molecular weight of about 15,000. This polymer was very much more stable than the 70,000 molecular weight polymer produced from the purified isobutylene alone and at the same time was sufficiently higher than the 3,000 molecular weight polymer produced from the 100% C₄ cut that it had satisfactory viscosity and V. I. (viscosity index) improving properties for its use in lubricating oils. Polymers having a molecular weight as low as about 3,000 have a slight viscosity-improving property in proportion to their molecular weight but do not substantially improve the V. I. of a lubricating oil to which it is added.

*Example VII*

If the tests carried out in Example VI are carried out at a much lower temperature, e. g. −103° C., as when liquefied ethylene is used as the refrigerant, the highly purified isobutylene produces a polymer having a molecular weight of about 150,000 but it is quite unstable to mechanical working; whereas, on the other hand, in the presence of added C₄ cut as a poison, the mixture produces a polymer having a molecular weight of about 70,000 which is far superior in stability to the 150,000 molecular weight polymer produced from the purified isobutylene, and at the same time is highly superior in stability to the 70,000 molecular weight polymer produced from the purified isobutylene at a temperature of −78° C. prepared in Example VI.

A diagrammatic elevational view of an apparatus suitable for carrying out the process of the present invention is illustrated in the attached drawing, in which (1) is a reactor into which is fed purified liquid isobutylene from inlet (2), liquid diluent, e. g., liquefied propane, from inlet (3), boron fluoride catalyst from inlet (4), and a proportioned amount of C₄ cut containing normal butylenes from inlet (5). A draw-off line (7) may be provided to remove the polymer product from the reactor, diluent may be recovered for reuse by leading vapors from the reactor by way of line (8) thru a pressure control valve (9), then purifying the diluent vapors to a desired extent before they are liquefied and recycled.

The present invention is particularly adapted to the production of solid polymers for blending lubricating oils so as to produce thickened oils of a higher viscosity index, and particularly in use in motor oils where stability is of importance, but it will be understood that the polymers may be used for any purpose and may be blended not only with lubricating oils, but with gasoline, kerosene, gas oils, waxes or greases. The invention is not to be limited by any theory of the blending qualities of such polymers, nor to the effect of the poisons, nor to any particular poison, nor to any theory of the increased stability, but only to the following claims in which it is desired to claim all novelty inherent in the invention.

This application is a continuation in part of application Serial No. 13,667 which was filed March 29, 1935.

We claim:

1. An improved method for producing high molecular weight viscous to plastic olefin polymers of increased stability, which comprises highly purifying an isobutylene fraction to remove therefrom all polymerization poisons, and adding thereto a major proportion of propane and a controlled quantity of light cracked petroleum fraction consisting essentially of hydrocarbons having 4 carbon atoms containing some isobutylene but also containing a substantial amount of normal butylenes as well as butanes, said amount of normal butylenes being essentially less than the combined amount of isobutylene in the mixture formed and polymerizing the mixture with boron fluoride at a temperature below −40° C.

2. An improved process for producing viscous to plastic polymers of isobutylene of increased stability comprising concentrating and purifying isobutylene from a light cracked oil cut rich in butane and butylene so as to obtain a fraction containing at least 90% isobutylene, adding this said purified cut and controlled quantity of the crude cut rich in butanes and butylenes so as to produce a mixture containing from 20 to 40% isobutylene and 10 to 20% of other olefins, the proportion of isobutylene essentially preponderating over the proportion of other olefins and polymerizing said mixture with boron fluoride at a temperature below −40° C.

3. A method for polymerizing isobutylene to viscous polymers of increased stability, which comprises admixing purified isobutylene with other olefins having 3 to 5 carbon atoms per molecule such as are normally present in a cracked petroleum C₄ cut, and with an inert hydrocarbon diluent to form a reaction mixture containing a major proportion of said diluent and about 20 to 40% of isobutylene, the remainder being in a minor proportion being said other olefins, and polymerizing the isobutylene in said mixture with boron fluoride as the catalyst at a temperature below −40° C.

MICHAEL OTTO.
HELMUTH G. SCHNEIDER.